(12) United States Patent
Elvanoglu et al.

(10) Patent No.: US 7,024,662 B2
(45) Date of Patent: Apr. 4, 2006

(54) EXECUTING DYNAMICALLY ASSIGNED FUNCTIONS WHILE PROVIDING SERVICES

(75) Inventors: Ferhan Elvanoglu, Redmond, WA (US); Shaun D. Pierce, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 10/062,045

(22) Filed: Jan. 31, 2002

(65) Prior Publication Data

US 2002/0184344 A1   Dec. 5, 2002

Related U.S. Application Data

(60) Provisional application No. 60/275,809, filed on Mar. 14, 2001.

(51) Int. Cl.
*G06F 9/44* (2006.01)
*G06F 15/16* (2006.01)
*H04L 9/00* (2006.01)

(52) U.S. Cl. .................. 717/127; 713/154; 709/219
(58) Field of Classification Search ........ 717/124–130; 714/38; 709/219; 713/154
See application file for complete search history.

(56) References Cited

U.S. PATENT DOCUMENTS

| 5,778,227 | A  | * | 7/1998  | Jordan ................. 707/103 R |
| 6,044,224 | A  | * | 3/2000  | Radia et al. ............. 717/162 |
| 6,199,081 | B1 |   | 3/2001  | Meyerzon et al. ......... 715/513 |
| 6,330,610 | B1 | * | 12/2001 | Docter et al. ............ 709/229 |
| 6,351,843 | B1 | * | 2/2002  | Berkley et al. ........... 717/128 |
| 6,490,721 | B1 | * | 12/2002 | Gorshkov et al. ......... 717/130 |
| 6,542,845 | B1 | * | 4/2003  | Grucci et al. ............ 702/122 |
| 6,604,209 | B1 | * | 8/2003  | Grucci et al. ............ 714/38  |
| 2002/0133752 | A1 | * | 9/2002  | Hand ....................... 714/38  |
| 2003/0074423 | A1 | * | 4/2003  | Mayberry et al. ......... 709/219 |

OTHER PUBLICATIONS

Barish, Greg; Untangling the Web; *Intelligent Enterprise*; Mar. 27, 2001; pp. 38-43.
Dix, Chris; Working With Soap, The Simple Object Access Protocol; *C/C++Users Journal*; Jan. 2002; pp. 22-33.
He, Hao; and Wang, Raymond K.; A Role-Based Access Control Model for XML Repositories; *IEEE*, 2000, pp. 138-145.
Jepsen, Tom; Soap Cleans up Interoperability Problems on the Web; *IT Pro*; Jan.-Feb. 2001; pp. 52-55.

(Continued)

*Primary Examiner*—Kakali Chaki
*Assistant Examiner*—Trenton J. Roche
(74) *Attorney, Agent, or Firm*—Workman Nydegger

(57) ABSTRACT

Methods, systems, and computer program products for applying actions during server system processing. Functional processing blocks where actions may be applied to a service request are identified. actions are dynamically associated with functional processing blocks. During execution of a functional processing block, a check is performed to determine whether an action is associated with the functional processing block. If an action is associated with a functional processing block, the action is applied during the functional processing block's execution. An evaluation may be performed to determine if an action should be applied before or after the functional processing block. The server system may comprise an XML data repository, providing access to XML data, based on identity information which is received with a client system request. A portion of the server system may be described in accordance with an XML schema.

40 Claims, 9 Drawing Sheets

OTHER PUBLICATIONS

X Marks the Path; *DNJ Online*; http://www.dnjonline.com/articles/essentials/iss25_ essentials_xpath.asp; Jan. 3, 2002; 6 pgs.

Soap Version 1.2 Part 1: Messaging Framework; http://www.w3.org/TR/2002/WD-soap12-part1-20011002; Nov. 30, 2001: 33 pgs.

Soap Version 1.2 Part 2: Adjuncts; http://www.w3.org/TR/2001/WD-soap12-part2-20011002; Oct. 30, 2001; 43 pgs.

XML Path Language (XPATH) Version 1.0; http://www.w3.org/TR/1999/REC-xpath-19991116; Oct. 30, 2001; 35 pgs.

\* cited by examiner

401A — Root
420A — Envelope
420A.1 — Header
420A.2 — Body

401B — Request
420B — Envelope
420B.1 — Header
420B.2 — Body
440B — Additional Information 401C — Response
420C — Envelope
420C.1 — Header
420C.2 — Body
440C — Additional Information Action Association List —600

620— Layer 1: before —620.1

620.1.1— xPathA   actionA

⋮ after —620.2

620.2.1— xPathB   actionB
620.2.2— xPathC   actionC

⋮

640— Layer 2: before —640.1

⋮

⋮ after —640.2

EXECUTING DYNAMICALLY ASSIGNED FUNCTIONS WHILE PROVIDING SERVICES

CROSS-REFERENCE TO RELATED APPLICATIONS

The present application claims priority from co-pending U.S. provisional application Ser. No. 60/275,809, filed Mar. 14, 2001 and entitled "Identity-Based Service Communication Using XML Messaging Interfaces", which provisional application is incorporated herein by reference in its entirety.

BACKGROUND OF THE INVENTION

1. The Field of the Invention

The present invention relates to the field of computer services. Specifically, the present invention relates to methods, systems, and computer program products for applying one or more functions during processing that may occur in a server providing one or more services.

2. Background and Related Art

Typically, before being deployed in a live system, services undergo significant testing to uncover programming errors and to evaluate performance. While useful, such testing often is able only to estimate full-scale use. As a result, certain program errors or performance problems may go undetected in development or testing environments. Finding these latent problems usually involves monitoring the operation of a service in one form or another. Furthermore, independent of programming errors or unexpected performance considerations, monitoring a service may be helpful in uncovering hardware failures and system attacks.

However, monitoring services for purposes of debugging, performance, hardware problems, system attacks, and the like, often involves various complex issues. For example, services by nature tend to be accessed by large numbers of clients. The shear volume of transactions can make monitoring services a significant exercise. Moreover, monitoring itself may introduce some amount of processing overhead. While the overhead for a single transaction is relatively small, the aggregate overhead for a large number of transactions may result in unacceptable levels of performance and skew any conclusions that are reached from the monitoring.

As a general rule, discovering problems through monitoring is an iterative process. For example, as noted above, it may be impractical to produce all possible monitoring information at all times, either due to the amount of monitoring information that will be produced or due to the negative effect that such monitoring may have on overall system performance. Therefore, monitoring often begins by detecting some type of high-level irregularity. Once discovered, the high-level irregularity may lead to more specific monitoring of increasingly specific processing or functionality until the problem's cause is discovered and corrected. After a particular problem is corrected, monitoring often returns back to the high-level system view.

In some systems, the iterative process of moving back and forth between high-level system monitoring and relatively lower level monitoring of specific service processing or functionality may require shutting services and/or servers down and restarting them. Furthermore, certain monitoring tools may require significant expertise to use, including programming skills. For many, the level of skill required may reduce the effectiveness of a particular monitoring tool or prevent its use all together. Also, monitoring tools are often specific to the environment in which they run, requiring administrators of heterogeneous systems to use different monitoring tools for each distinct system. Accordingly, methods, systems, and computer program products are desired for dynamically applying a function during any of various processing steps that may occur in providing a service to a client system.

BRIEF SUMMARY OF THE INVENTION

The present invention extends to methods, systems and computer products for dynamically executing one or more functions at any of one or more processing steps that may occur in providing a service to a client system. In one embodiment, executing the one or more functions during identified processing steps provides significant flexibility for dynamically monitoring the operation of the service being analyzed. By identifying particular processing steps that are executed during operation of the service, specific functions may be designated for execution when the processing steps occur. These specific functions are dynamically associated with the processing steps so that the type and extent of monitoring can be adjusted quickly to allow for rapid and efficient problem diagnosis.

As a processing step executes, a check is performed to determine if an operation or action is associated with the processing step. This may include evaluating whether an associated operation should be performed before the processing step or after the processing step. Then, for processing steps with an associated operation, the operation is applied in conjunction with the execution of the processing step. Typically, the processing steps are related to processing requests from clients systems that are directed to a service. In these circumstances, request for the service is received, a response to the request is generated, and the response is sent to the client.

The response and request may be organized hierarchically within a network message. One popular hierarchical organization uses eXtensible Markup Language ("XML") formatted data, with network messages being based on Simple Object Access Protocol ("SOAP"). Although binary data is contrary to the XML standard, the invention may include binary data within the hierarchical organization. For example, it may be desirable to attach certain debugging or diagnostic information to a request or response, and a binary format may be a convenient representation for that information.

Functions associated with processing steps may be predefined or custom, depending on monitoring needs or wants. Predefined functions are advantageous because certain operations or actions are likely to be commonly used in many monitoring scenarios and therefore predefined functions may provide enhanced value. By allowing for custom functions, individual monitoring circumstances may be addressed in a meaningful way. Describing at least a portion of the server system in terms of a hierarchical organization may add to the flexibility of custom functions and provide a mechanism for writing monitoring functions that are useful across multiple operating platforms. Here again, an organization based on XML may be desirable given the popularity and flexibility of the language.

Typical operations for functions may include a logging function and a filtering function. In general, logging functions write certain information to a log of some sort for analysis. Filtering functions may be used to end processing of a request and send a response to the requesting client.

Among other things, logging and filtering may be useful in monitoring error conditions that occur while processing a client's request.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 6 illustrates an example organization for assigning functions to processing steps in accordance with the present invention;

DETAILED DESCRIPTION OF THE PREFERRED EMBODIMENTS

The present invention extends to methods, systems, and computer program products for applying one or more operations or actions during the processing that may occur in a server providing one or more services. Through the identification of discrete processing steps that are executed while a service operates, specific operations may be executed along with each processing step. These operations are dynamically associated with the processing steps such that as a processing step executes, a check is performed to determine if any operations exists for the processing step. For processing steps that include an operation, the operation is applied during execution of the processing step.

Embodiments within the scope of the present invention may comprise one or more special purpose and/or one or more general purpose computers including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
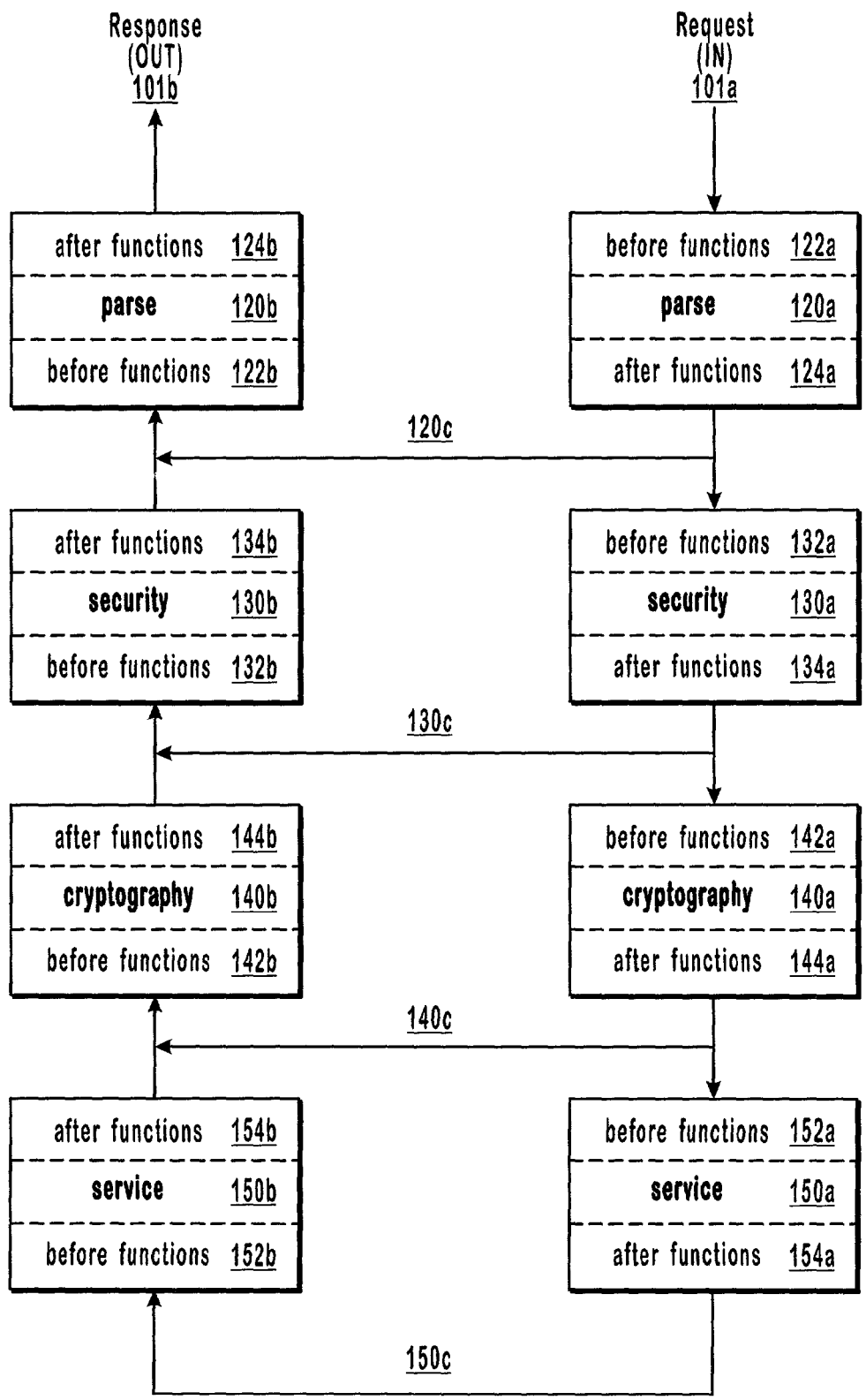
FIG. 1 is a block diagram of an example server system embodiment that operates in accordance with the present invention.

FIG. 1 shows a block diagram of an example server system that operates in accordance with the present invention. The server system uses several distinct processing layers in processing a request 101a from a client, including a parse layer, a security layer, a cryptography layer and a service layer. Each of these layers is divided into a request processing component and a response processing component. There are corresponding response and request components for each layer. Note, however, that the present invention is not necessarily limited to any particular process layering or component division.

On the request 101a, an incoming request first passes through parse component 120a. For example, parse component 120a may be used to parse a request 101a that includes XML data, such as the XML document 200A shown in FIG. 2A. By way of background, XML is a markup language that provides for data typing and namespaces. For XML document 200A, the default namespace is "x-schema:classSchema.xml" 201A(1). This informs the parser to validate the document against the schema "x-schema" at the URL "classSchema.xml."

Figure 2A:
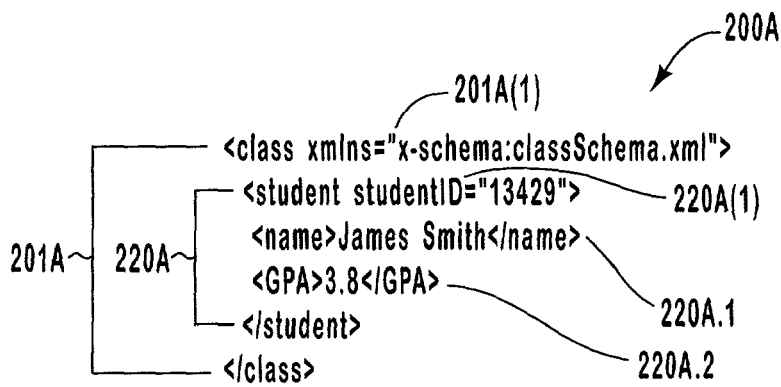
FIG. 2A shows an example XML document corresponding to the example XML schema of FIG. 2B.
Figure 2B:
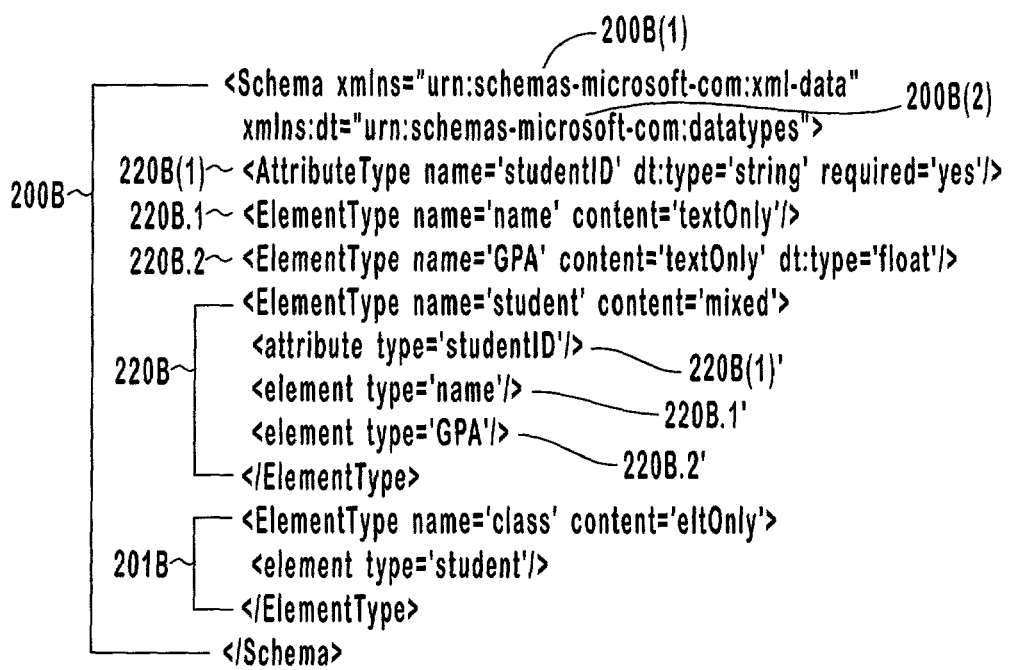
FIG. 2B illustrates an example XML schema corresponding to the example XML document of FIG. 2A.

FIG. 2B shows the entire schema for the document of FIG. 2A. The top level of the schema is <Schema></Schema> element pair 200B that contains the declaration of the schema namespace and, in this case, the declaration of the "datatypes" namespace as well. The first, "xmlns="urn:schemas-microsoft-com:xml-data"," 200B(1) indicates that this XML document is an XML Schema. The second, "xmlns:dt="urn:schemas-microsoft-com:datatypes"," 200B(2) allows for typing element and attribute content by using a "dt" prefix on the type attribute within their ElementType and AttributeType declarations.

"ElementType" assigns a type and conditions to an element, and what, if any, child elements it can contain;

"AttributeType" assigns a type and conditions to an attribute; "attribute" declares that a previously defined attribute type can appear within the scope of the named ElementType element; and "element" declares that a previously defined element type can appear within the scope of the named ElementType element. The content of the schema begins with the AttributeType and ElementType declarations of the innermost elements, namely:

```
<AttributeType name = 'studentID' dt:type = 'string'        220B(1);
required = 'yes'/>
<ElementType name = 'name' content = 'textOnly'/>           200B.1; and
<ElementType name = 'GPA' content = 'textOnly'              200B.2.
dt:type = 'float'/>
```

The next ElementType declaration is followed by its attribute and child elements. When an element has attributes or child elements, they are in its ElementType declaration. They also are previously declared in their own ElementType or AttributeType declaration. In particular,

```
<ElementType name = 'student' content = 'mixed' >    220B;
    <attribute type = 'studentID'/>                  220B(1)';
    <element type = 'name'/>                         220B.1;
    <element type = 'GPA'/>                          220B.2'; and
</ElementType>                                       220B.
```

The process is continued throughout the rest of the schema until every element and attribute has been declared:

```
<ElementType name = 'class' content = 'eltOnly'>     201B;
    <element type = 'student'/>                      ;
</ElementType>                                       201B.
```

Notice that the reference numbers for the XML document shown in FIG. 2A correspond to the schema declarations in FIG. 2B. Specifically,

```
<class xmlns = "x-schema:classSchema.xml">    201A;
    <student studentID = "13429">             220A;
        <name>James Smith</name>              220A.1;
        <GPA>3.8</GPA>                        220A.2;
    </student>                                220A;
</class>                                      201A.
```

Figure 3A:
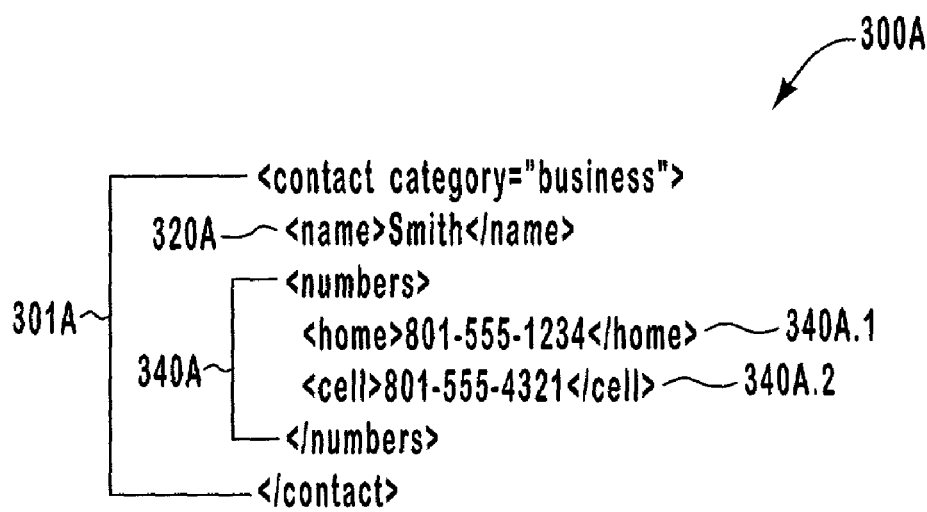
FIG. 3A shows an example XML document corresponding to the example xPath statement of FIG. 3B.
Figure 3B:
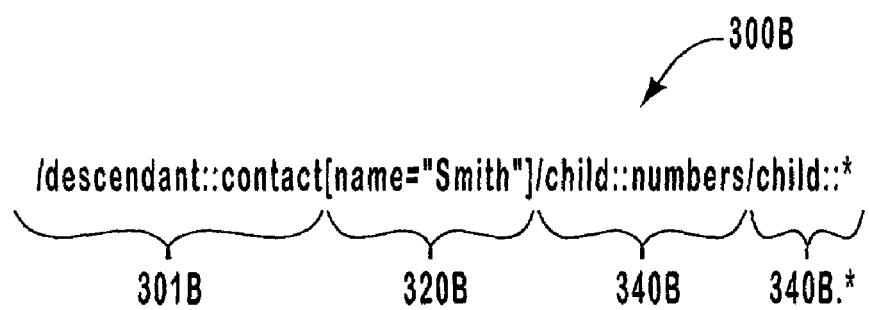
FIG. 3B illustrates an example xPath statement corresponding to the example XML document of FIG. 3A.

The example XML document 300A in FIG. 3A will be used in conjunction with the xPath statement 300B shown in FIG. 3B. In general, xPath uses abstract document relationships in identifying parts of a document. For example, the xPath statement 300B locates Smith's numbers within the XML document 300A. Similar to FIGS. 2A and 2B, notice that the reference numbers for the XML document 300A of FIG. 3A correspond to xPath statement 300B of FIG. 3B.

Specifically, the "/descendant::contact" portion 301B of the xPath statement 300B maps to descendants of the <contact> </contact> tag pair 301A. The "[name="Smith"]" portion 320B selects the "<name>Smith</name>" 320A contact entry, and the "/child::numbers" portion 340B selects the <numbers></numbers>children of contact 301A. "/child::*" identifies the specific children (i.e., "<home>801-555-1234</home>" 340A.1 and "<cell>801-555-4321</cell>" 340A.2) that are of interest. (The star or asterisk is a wildcard indicating that all children are of interest.)

Referring back to FIG. 1, parse component 120a includes before functions 122a that are executed prior to parse component 120a and after functions 124a that are executed after parse component 120a. Path 120c shows that processing may proceed to parse 120b on the response side following the operation of parse component 120a. Proceeding to parse 120b following parse 120a may be the result of a parse error or may be dictated by before functions 122a or after functions 124a, in which case it makes little sense to continue on to security 130a. For example, after at least some parsing, after functions 124a may be able to determine that some problem exists with the request 101a. After functions 124a may determine that request 101a is part of a denial of service attack or that request 101a includes content or originates from a source that is blocked for some reason, such as inappropriate material or spam.

Parse component 120a may indicate that processing should continue with security component 130a. Security component 130a determines the identity associated with the request 101a. In one embodiment, this involves determining an application identifier, a user identifier, and a platform identifier for request 101a, because the service layer provides storage and access to data that is identity specific. For example, a user may access the service layer for email, calendar items, contacts, etc., using both a PC and a handheld device. The security layer, and security component 130a, determines the appropriate identity so that data and operations are appropriate to the device being used for access. Similarly, different users may be allowed different access to the same data. For example, an owner might be able to add, delete, and modify data, whereas a delegate may only have read privileges. The type of access permitted is controlled by role list database that contains various rules for determining access rights. Nevertheless, as noted the present invention does not necessarily require a security layer, and if one is present, it need not operate as security component 130a. A failure in the security layer may result in proceeding along path 130c or assigning default access privileges.

It may seem somewhat redundant to allow for both after functions 124a in parse component 120a and before functions 132a in security component 130a. However, because processing may proceed along path 120c, functions 132a will not necessarily be invoked for a request 101a. Further, associating functions closely with a particular layer provides for greater clarity as to when the function will be executed. A similar analysis holds true for after functions 134b of security component 130b and before functions 122b of parse component 120b. It should be emphasized, nevertheless, that the present invention does not necessarily require the specific association of functions with processing steps that is shown in FIG. 1. Therefore, the assignment of functions to processing steps should be interpreted broadly to cover a wide range of function associations. From security component 130a, processing proceeds to either security component 130b or to cryptography component 140a.

Similar to other components, cryptography component 140a includes before functions 142a and after functions 144a. Cryptography component 140a is responsible for any decryption that is needed for request 101a. In one embodiment, request 101a is a Simple Object Access Protocol ("SOAP") request, conforming to the hierarchy 400A illustrated in FIG. 4A. Basically, a SOAP message includes an envelope 420A with a header 420A.1 and a body 420A.2, where the envelope 420A is at the root level 401A.

Figure 4A:
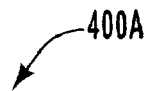
FIG. 4A depicts the hierarchy of an example SOAP message.
Figure 4B:
FIG. 4B shows the request portion of an overall example hierarchy illustrated in FIG. 5.
Figure 4C:
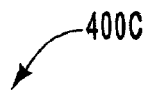
FIG. 4C shows the response portion of an overall example hierarchy illustrated in FIG. 5.
Figure 5:
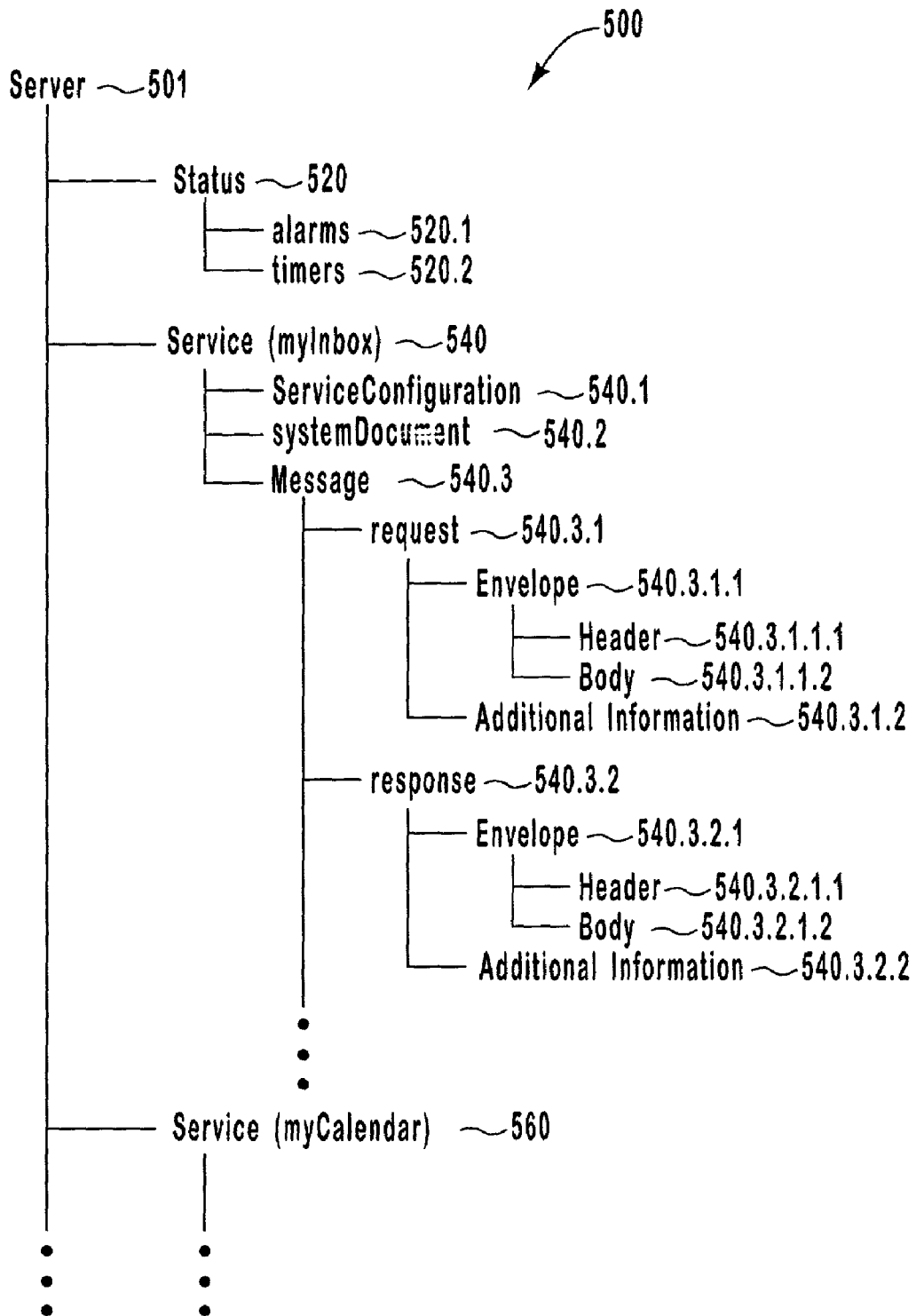
FIG. 5 shows a more complete portion of a hierarchal organization for message processing corresponding to the example server system embodiment of FIG. 1.

FIG. 4B shows the request portion and FIG. 4C shows the response portion of an overall example hierarchy illustrated in FIG. 5. Here too, references have been selected so that corresponding portions are FIGS. 4A, 4B, and 4C are similarly numbered. The example hierarchy illustrated in FIG. 5 will be described in greater detail below. It should be noted that in FIG. 4B, envelope 420B is at the request level 401B (rather than the root level) and that the request level 401B includes additional information 440B. Envelope 420B continues to include header 420B.1 and body 420B.2. Likewise, in FIG. 4C, envelope 420C is at the response level 401C (rather than the root level) and the response level 401C includes additional information 440C. Envelope 420C continues to include header 420C.1 and body 420C.2.

Adding the request level 401B and the response level 401C removes ambiguity from the single root level 401A that is illustrated in FIG. 4A. As a result, it is clear whether a locator statement such as an xPath statement references a request 101a or response 101b (both of FIG. 1), without the need to determine the processing context of the xPath statement. The additional information 440B and 440C may be used to store information that may be helpful in monitoring a service. The additional information may comprise binary data, including a data structure or data object. For example, additional information 440C may contain a detailed error chain. The present invention is not limited to any particular type or format of additional information.

Returning now to FIG. 1, the body of a SOAP request is encrypted, so cryptography component 140a performs the necessary decryption. Those of skill in the art will recognize that there is not much value to parsing an encrypted SOAP body. Therefore, parse 120a may be limited initially to those portions of request 101a that are not encrypted. Then, following cryptography 140a, parse component 120a may continue with the decrypted portions of request 101a. At this point, it is worth noting that the flow from layer to layer need not be strictly sequential to fall within the scope of the present invention. A cryptography failure will result in proceeding with processing along path 140c.

Following cryptography 140a, processing proceeds to service 150a and before functions 152a and after functions 154a. Service 150a represents the processing that carries out the methods that may be included with request 101a. For example, request 101a may attempt to query, insert, replace, update or delete data maintained by service 150a, such as email, calendar items, contacts, spreadsheet, word processing documents, or the like. Although described as a data store that is manipulated with XML, the present invention is not necessarily limited to any particular type or service, or any particular access mechanism for identity-specific data.

Turning next to the processing for response 101b, service component 150b prepares an appropriate response to the methods that may be included with request 101a. For example a response may include data that is queried or indicate whether an insert, update, replace, or delete operation was successful or failed. Failures may include error codes of some sort, with more substantial debugging or error information in the response's additional information 440C (FIG. 4C). Service component 150b includes before functions 152b and after functions 154b. Notice that the ordering of the before functions and after functions on the response side is opposite the ordering on the request side because the flow from layer to layer is reversed.

Cryptography component 140b follows service component 150b or path 140c from cryptography 140a. As indicated earlier, the body of a SOAP message is encrypted. For response 101b, the cryptography layer, and cryptography component 140b in particular, performs the encryption. Note that service component 150b and cryptography component 140b essentially perform analogous or complementary functionality for the corresponding service component 150a and cryptography component 140a of the respective layers.

The present invention, however, does not necessary require analogous or complementary functionality in each layer. For example, there is no analogous or complementary functionality provided by security 130b. Nevertheless, it may still be desirable to allow for before functions 132b and after functions 134b, whether processing flowed from cryptography component 140b or from security component 130a through processing path 130c.

Like security component 130b, there is no analogous or complementary function of parse component 120a to be performed by parse component 120b. Still, before functions 122b and after functions 124b may provide desirable functionality in some circumstances. Both parse component 120b and security component 130b may simply pass whatever is present in response 101b to the next level.

At this stage, it may be worth identifying some types of functions that may be applicable to each processing layer. Two examples of commonly applicable functions are logging and filtering. Logging is generally associated with monitoring, although not exclusively so. For performance, debugging, identifying hardware problems, detecting system attacks, and the like, logging may provide valuable information for each layer (both prior to and following execution of the layer). Filtering relates to terminating further processing, usually with respect to a request. Filtering might include detecting a denial of service attack or other type of attack, preventing access to certain content, such as pornographic material, stopping spam or other unsolicited interaction, or the like.

FIG. 5 shows a more complete portion of a hierarchal organization for message processing corresponding to the example server system embodiment of FIG. 1. Server 501 identifies at least one server that is responsible for providing one or more services. Note that server 501 provides services for messages directed to myInbox (540), messages directed to myCalendar (560), and messages directed to other services. In some circumstances it may be desirable for a single server to provide multiple services whereas in other circumstances it may be desirable for a server to provide only one service. In addition, a single server may be made up of multiple computers and multiple servers may be used to provide a single service. The present invention does not require any particular hardware configurations and each of the foregoing examples, including combinations thereof, is an example of a server system and should be included within the scope of the present invention.

Server 501 includes various status indicators 520, including alarms 520.1 and timers 520.2. These status indicators may be used by any of the processing layers shown in FIG. 1. Within myInbox 540, service configuration 520.3 and system document 520.4 contain configuration information, security information, identity information, and other data that may be necessary or useful a service. As noted earlier, for a particular message, such as message 540.3, request 540.3.1, with envelope 540.3.1.1, header 540.3.1.1.1, body 540.3.1.1.2, and additional information 540.3.1.2, and response 540.3.2, with envelope 540.3.2.1, header 540.3.2.1.1, body 540.3.2.1.2, and additional information 540.3.2.2, correspond to FIGS. 4B and 4C, respectively. FIG. 5 is one example of describing at least a portion of a server system in accordance with an XML schema. However, it should be emphasized that many other hierarchical arrangements are possible and that the present invention is not limited to any particular description.

FIG. 6 illustrates an action association list 600 for assigning functions to processing steps in accordance with the present invention. Action association list 600 identifies a layer 1 620 processing step, a layer 2 640 processing step, and other layer processing steps. Layer 1 620 processing step specifies whether a particular action should be executed before 620.1 layer 1 or after 620.2 layer 1. Prior to execution of layer 1, if xPathA 620.1.1 is present in the XML hierarchy 500 shown in FIG. 5, actionA is applied. Similarly, after execution of layer 1, if xPathB 620.2.1 is present in the XML hierarchy 500, actionB is applied, and if xPathC 620.2.2 is present in the XML hierarchy 500, actionC is applied. Depending on how actionb is defined, it is possible for xPathC to either be ignored or processed. Although no details are shown, before 640.1 and after 640.2 of layer 2 640 operate in an analogous fashion.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of the acts and/or steps.

Figure 7A:
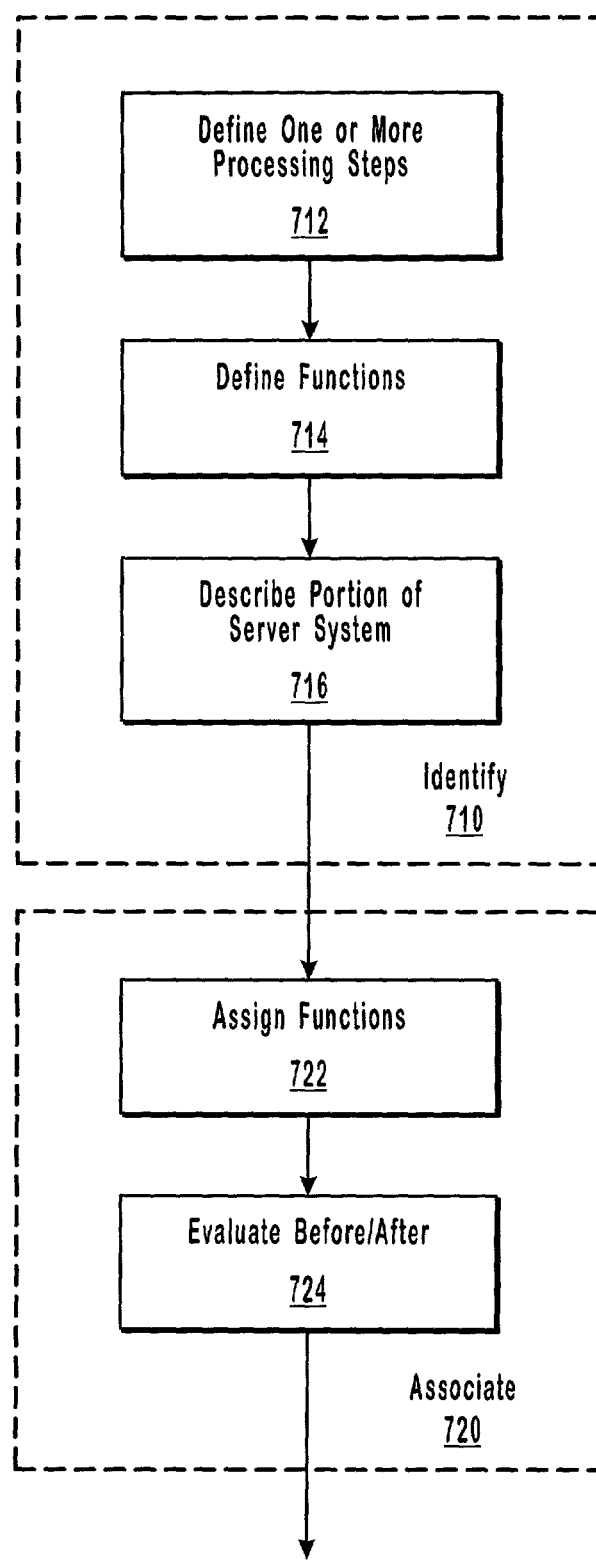
FIGS. 7A–7B show a flowchart of a method for executing one or more functions at any of one or ore processing steps in accordance with the present invention.
Figure 7B:
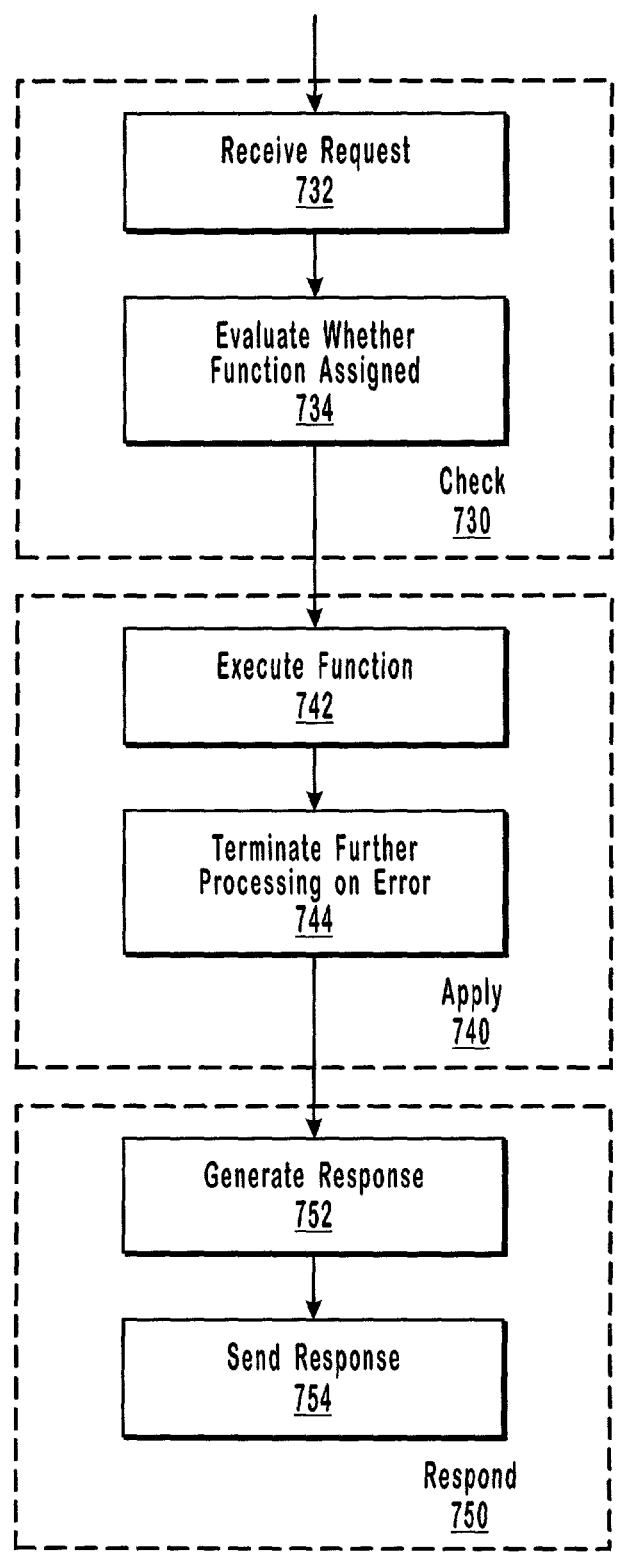

FIGS. 7A and 7B are a flow diagram that describe various acts and steps for methods according to the present invention. A step for identifying (710) one or more functional processing blocks where one or more operations or actions may be applied to one or more requests directed to one or more services may include acts of: defining (712) one or more processing steps within a server system that provides one or more services; defining (714) one or more functions that may be executed at any of the one or more processing steps; and describing (716) at least a portion of the server system in accordance with an XML schema. An act of defining (714) one or more functions should be interpreted broadly to include selecting a predefined function or creating a new function.

It should be noted that the terms such as "service," "processing step," "functional processing block," "operation,""function," and "action" should be interpreted broadly to encompass a wide variety of computer processing. Often, the term "service" is used as a generic reference for some type of computer resource. For example, an embodiment of the present invention is described in the context of an overall service that provides access to identity-based data, with one or more individual services within the overall service being dedicated to particular types of data, such as email, contacts, calendar, tasks, documents, etc. As used in this application, therefore, "service" is not necessarily limited to any particular type of computing resource, and any service specifically identified should be interpreted merely as an example.

Similarly, the terms "processing step," "functional processing block," "operation," "function," and "action" are often used as generic references for some division or grouping of one or more computer instructions that accomplish a particular task. With reference to the service that provides access to identity-based data, "processing steps" and "functional blocks" generally are associated with the parsing, security, cryptography, and service operations, whereas "operations," "functions," and "actions" generally are associated with logging and filtering. Nevertheless, each of the foregoing terms is used throughout the application in a generic sense. The general associations identified above, therefore, should not necessarily be interpreted as limiting any of these terms to the specific examples used merely in describing an embodiment of the present invention. As such, "processing step," "functional processing block," "operation," "function," and "action" should not be limited to any particular division or grouping of computer instructions, and any more specific description should be understood simply to represent an example.

A step for dynamically associating (720) at least one operation or action for at least one of the one or more functional processing blocks may include acts of: assigning (722) at least one function to at least one of one or more processing steps; and an act of evaluating (724) whether the at least one dynamically assigned function should be executed either before or after the at least one of the one or more processing steps. A step for checking (730) whether or not any action has been associated with a particular functional processing block during execution of the particular functional processing block may include acts of: receiving (732) a request for one or more services from a client system; and evaluating (734) whether or not any function has been assigned to a processing step.

A step for applying (740) one or more associated operations or actions during execution of any function processing block with one or more associated actions may include acts of: executing (742) at least one assigned function at each processing step that has at least one assigned function; and terminating (744) any further processing on a request received from a client system. A step for responding (750) to a client system based on a request for one or more services from a client system may include acts of: generating (752) a response; and sending (754) the response to the client system.

Having now described the principles of the present invention in detail, it is noted that the precise hardware configuration that implements the above-described features is not important to the present invention. For example, it is not important to the principles of the present invention where the various components of FIG. 1 are implemented.

Figure 8:
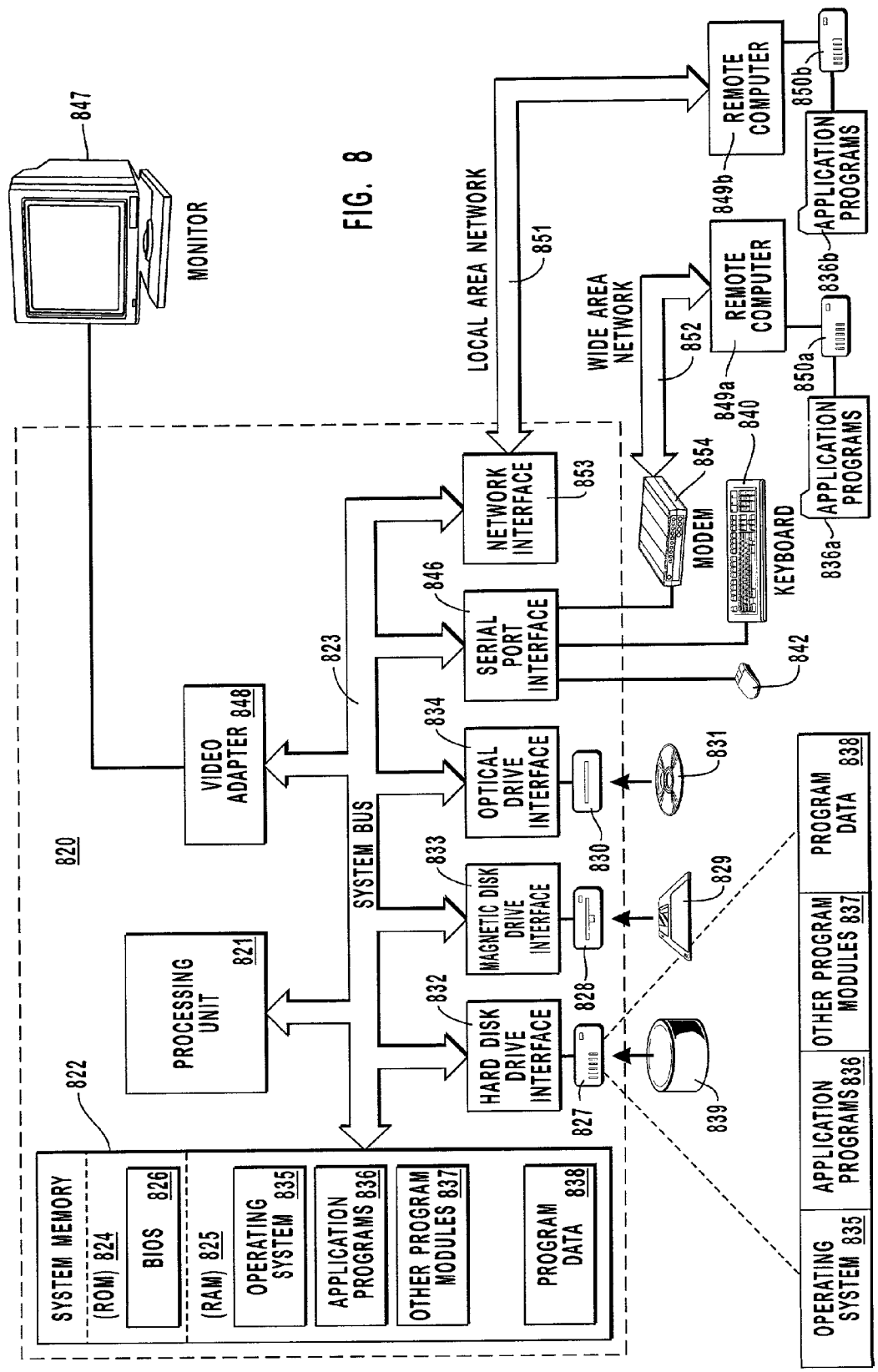
FIG. 8 illustrates an exemplary system that provides a suitable operating environment for the present invention.

Nevertheless, for the sake of completeness, FIG. 8 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 8, an exemplary system for implementing the invention includes a general purpose computing device in the form of a conventional computer 820, including a processing unit 821, a system memory 822, and a system bus 823 that couples various system components including the system memory 822 to the processing unit 821. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824.

The computer 820 may also include a magnetic hard disk drive 827 for reading from and writing to a magnetic hard disk 839, a magnetic disk drive 828 for reading from or writing to a removable magnetic disk 829, and an optical disc drive 830 for reading from or writing to removable optical disc 831 such as a CD-ROM or other optical media. The magnetic hard disk drive 827, magnetic disk drive 828, and optical disc drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the exemplary environment described herein employs a magnetic hard disk 839, a removable magnetic disk 829 and a removable optical disc 831, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 839, magnetic disk 829, optical disc 831, ROM 824 or RAM 825, including an operating system 835, one or more application programs 836, other program modules 837, and program data 838. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849a and 849b. Remote computers 849a and 849b may each be another personal computer, a server, a router, a network PC, a peer device or other common network node, and typically include many or all of the elements described above relative to the computer 820, although only memory storage devices 850a and 850b and their associated application programs 836a and 836b have been illustrated in FIG. 1. The logical connections depicted in FIG. 1 include a local area network (LAN) 851 and a wide area network (WAN) 852 that are presented here by way of example and not limitation. Such networking environments are commonplace in office-wide or enterprise-wide computer networks, intranets and the Internet.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a server system providing one or more services, a method of dynamically executing one or more filtering functions at any of one or more processing steps that may occur in providing the one or more services to one or more client systems, the method comprising:
   an act of defining one or more processing steps that are performed by a server system in providing one or more services in response to a request, the one or more processing steps being defined within a plurality of processing layers of the server, the plurality of processing layers including at least a parsing layer;
   an act of dynamically assigning at least one filtering function to at least one of the one or more processing steps, wherein the filtering function is configured to terminate further processing based on content in the request;
   at each processing step that is processed, an act of dynamically evaluating whether or not any filtering function has been assigned; and
   at each processing step that is processed and has at least one assigned filtering function, an act of executing the at least one assigned filtering function by terminating further processing when the request contains particular content.

2. A method as recited in claim 1, further comprising an act of evaluating whether the at least one dynamically assigned filtering function should be executed either before or after the at least one of the one or more processing steps.

3. A method as recited in claim 1, wherein the one or more processing steps enable processing requests from client systems, the method further comprising:
   an act of receiving the request for the one or more services from the client system;
   based on the request for to one or more services, an act of generating a response; and
   an act of sending the response to the client system.

4. A method as recited in claim 3, wherein the request and the response comprise data organized hierarchically within a network message.

5. A method as recited in claim 4, wherein the hierarchically organized data comprises extensible Markup Language ("XML") formatted data, and wherein the network message comprises a Simple Object Access Protocol ("SOAP") network message.

6. A method as recited in claim 5, wherein the hierarchically organized data comprises binary data.

7. A method as recited in claim 1, further comprising an act of defining one or more filtering functions that may be executed at any of the one or more defined processing steps.

8. A method as recited in claim 1, wherein the server system comprises an eXtensible Markup Language ("XML") data repository providing access to XML data based on identity information that is received with the request from a client system for the one or more services provided by the server system.

9. A method as recited in claim 1, wherein the method further comprises an act of describing at least a portion of the server system in accordance wit an eXtensible Markup Language ("XML") schema.

10. A method as recited in claim 9, wherein the plurality of layers further comprise a security layer, a cryptography layer, and a service layer.

11. A method as recited in claim 10, wherein the at least one filtering function comprises terminating further processing when the request contains at least one of spam, pornographic material, or unsolicited content.

12. A method as recited in claim 1, wherein executing the assigned function detects filtering condition in a request received from a client system, the method further comprising:
an act of terminating any further processing on the request; and
an act of generating a response that includes information about the filtering condition.

13. A method as recited in claim 1, further comprising an act of dynamically unassigning the at least one filtering function from the at least one of the one or more processing steps.

14. In a saver system for providing one or more services to one or more client systems, wherein the server system comprises one or more functional processing blocks, a method of dynamically applying one or more filtering actions while executing any of the one or more functional processing blocks, the method comprising:
within a server system providing one or more services in response to a client request, a step for identifying one or more functional processing blocks where one or more filtering actions may be applied to one or more requests directed to the one or more services, wherein the functional processing blocks are identified within a plurality of processing layers of the server, the plurality of processing layers including at least a parsing layer;
for at least one of the one or more functional processing blocks, a step for dynamically associating at least one filtering action, the filtering action configured to terminate further processing based on content in the request;
a step for checking whether or not any filtering action has been associated with a particular functional processing block during execution of the particular functional processing block; and
during execution of any functional processing block with one or more associated actions, a step for applying the one or more associated filtering actions by terminating further processing when the request contains particular content.

15. A method as recited in claim 14, wherein the step for dynamically associating at least one filtering action comprises an act of evaluating whether the at least one dynamically associated filtering action should be applied before or after the at least one of the one or more functional processing blocks.

16. A method as recited in claim 14, further comprising a step for responding to a client system based on the request for the one or more services from the client system.

17. A method as recited in claim 14, wherein the request and a response to the client system comprise data organized hierarchically within a network message, the hierarchically organized data comprising eXtensible Markup Language ("XML") formatted data, and the network message comprising a Simple Object Access Protocol ("SOAP") network message.

18. A method as recited in claim 14, wherein the sewer system comprises data that can be manipulated wit eXtensible Markup Language ("XML"), and wherein access to the data is governed by the identity of the requestor.

19. A method as recited in claim 14, wherein the server system comprises a plurality of processing layers, and wherein the plurality of layers comprise at least one of a security layer, a cryptography layer, and a service layer, and wherein the at least one filtering action comprises terminating further processing when the request contains at least one of spam, pornographic material, or unsolicited content.

20. A method as recited in claim 14, further comprising a step for dynamically disassociating the at least one filtering action from the at least one of the one or more functional processing blocks.

21. A computer program product for use in a server system providing one or more services, the computer program product implementing a method of dynamically executing one or more filtering functions at any of one or more processing steps that may occur in providing the one or more services to one or more client systems, wherein the computer program product comprises one or more computer-readable media candying computer executable instructions for implementing the method, wherein the one or more computer-readable media are physical storage media, and wherein the method comprises acts of:
defining one or more processing steps that are performed by a server system in providing one or more services in response to a request, the one or more processing steps being defined within a plurality of processing layers of the server, the plurality of processing layers including at least a parsing layer;
dynamically assigning at least one filtering function to at least one of the one or more processing steps, wherein the filtering function is configured to terminate further processing based on content in the request;
at each processing step that is processed, dynamically evaluating whether or not any filtering function has been assigned; and
at each processing step that is processed and has at least one assigned filtering function, executing the at least one assigned function by terminating further processing when the request contains particular content.

22. A computer program product as recited in claim 21, the method further comprising an act of evaluating whether the at least one dynamically assigned filtering function should be executed either before or after the at least one of the one or more processing steps.

23. A computer program product as recited in claim 21, wherein the one or more processing steps enable processing requests from client systems, the method further comprising acts of:
receiving the request for the one or more services from the client system;
based on the request for the one or more services, generating a response; and
sending the response to the client system.

24. A computer program product as recited in claim 23, wherein the request and the response comprise data organized hierarchically within a network message.

25. A computer program product as recited in claim 24, wherein the hierarchically organized data comprises eXtensible Markup Language ("XML") formatted data, and wherein the network message comprises a Simple Object Access Protocol ("SOAP") network message.

26. A computer program product as recited in claim 21, wherein the server system comprises an eXtensible Markup Language ("XML") data repository providing access to XML data based on identity information that is received with the request from a client system for the one or more services provided by the server system.

27. A computer program product as recited in claim 21, wherein the plurality of layers further comprise at least a security layer, a cryptography layer, and a service layer.

28. A computer program product as recited in claim 21, wherein the at least one function comprises terminating further processing when the request contains at least one of spam, pornographic material, or unsolicited content.

29. A computer program product as recited in claim 21, wherein executing the assigned function detects filtering condition in the request received from a client system, the method further comprising acts of:
terminating any further processing on the request; and
generating a response that includes information about the filtering condition.

30. A computer program product as recited in claim 21, the method further comprising an act of dynamically unassigning the at least one filtering function from the at least one of the one or more processing steps.

31. A computer program product for use in a server system that provides one or more services to one or more client systems, wherein the server system comprises one or more functional processing blocks, the computer program product implementing a method of dynamically applying one or more filtering actions while executing any of the one or more functional processing blocks, wherein the computer program product comprising one or more computer-readable media crying computer executable instructions for implementing the method, wherein the one or more computer-readable media are physical storage media, and wherein the method comprises steps for:
within a server system providing one or more services, identifying one or more functional processing blocks where one or more filtering actions may be applied to one or more requests directed to the one or more services, wherein the functional processing blocks are identified within a plurality of processing layers of the server, the plurality of processing layers including at least a parsing layer, the filtering action configured to terminate further processing based on content in the one or more requests;
for at least one of the one or more functional processing blocks, dynamically associating at least one filtering action;
checking whether or not any filtering action has been associated with a particular functional processing block during execution of the particular functional processing block; and
during execution of any functional processing block with one or more associated actions, applying the one or more associated filtering actions by terminating further processing when the one or more requests contains particular content.

32. A computer program product as recited in claim 31, wherein the step for dynamically associating at least one filtering action comprises an act of evaluating whether the at least one dynamically associated filtering action should be applied before or after the at least one of the one or more functional processing blocks.

33. A computer program product as recited in claim 31, wherein the request and a response to the client system comprise data organized hierarchically within a network message, the hierarchically organized data comprising eXtensible Markup Language ("XML") formatted data, and the network message comprising a Simple Object Access Protocol ("SOAP") network message.

34. A computer program product as recited in claim 31, wherein the sever system comprises data that can be manipulated with extensible Markup Language ("XML"), and wherein access to the data is governed by the identity of the requestor.

35. A computer program product as recited in claim 31, wherein the server system comprises a plurality of processing layers, and wherein the plurality of layers comprise at least one of a security layer, a cryptography layer, and a service layer, and wherein the at least one filtering action comprises terminating further processing when a request contains at least one of spam, pornographic material, or unsolicited contend.

36. A computer program product as recited in claim 31, the method further comprising a step for dynamically disassociating the at least one filtering action from the at least one of the one or more functional processing blocks.

37. A method as recited in claim 1, wherein the parsing layer comprises means for determining that there are errors with the request.

38. A method as recited in claim 1, wherein the at least one filtering function, which is associated with at least one of the plurality of layers is redundant with another filtering function associated with a different one of the plurality of layers.

39. A method as recited in claim 1, wherein the at least one filtering function is predefined.

40. A method as recited in claim 1, wherein the at least one filtering is a custom function.

* * * * *

UNITED STATES PATENT AND TRADEMARK OFFICE
CERTIFICATE OF CORRECTION

PATENT NO. : 7,024,662 B2
APPLICATION NO. : 10/062045
DATED : April 4, 2006
INVENTOR(S) : Ferhan Elvanoglu et al.

It is certified that error appears in the above-identified patent and that said Letters Patent is hereby corrected as shown below:

On the title page, item (56), under "Other Publications", in column 2, line 4, delete "C/C++Users" and insert -- C/C++ Users --, therefor.

On the title page, item (56), under "Other Publications", in column 2, line 5, delete "Wang" and insert -- Wong --, therefor.

On the title page, item (57), under "Abstract", in column 2, line 4, delete "actions" and insert -- Actions --, therefor.

On page 2, item (56), under "Other Publications", in column 1, line 2, delete "iss25_ essentials" and insert -- iss25_essentials --, therefor.

On page 2, item (56), under "Other Publications", in column 1, line 6, delete "2001:" and insert -- 2001; --, therefor.

In column 9, line 15, delete "actionb" and insert -- actionB --, therefor.

In column 9, line(s) 45–46, delete ""operation,""function,"" and insert -- "operation," "function," --, therefor.

In column 12, line 65, in Claim 3, after "request for" delete "to" and insert -- the --, therefor.

In column 13, line 5, in Claim 5, delete "extensible" and insert -- eXtensible --, therefor.

In column 13, line 22, in Claim 9, delete "wit" and insert -- with --, therefor.

In column 13, line 44, in Claim 14, delete "saver" and insert -- server --, therefor.

In column 14, line 20, in Claim 18, delete "sewer" and insert -- server --, therefor.

In column 14, line 21, in Claim 18, delete "wit" and insert -- with --, therefor.

In column 14, line 42, in Claim 21, delete "candying" and insert -- carrying --, therefor.

In column 15, line 32, in Claim 29, after "detects" insert -- a --.

In column 15, line 50, in Claim 31, delete "crying" and insert -- carrying --, therefor.

CERTIFICATE OF CORRECTION (continued)
U.S. Pat. No. 7,024,662 B2

In column 16, line 31, in Claim 34, delete "sever" and insert -- server --, therefor.

In column 16, line 32, in Claim 34, delete "extensible" and insert -- eXtensible --, therefor.

In column 16, line 42, in Claim 35, delete "contend" and insert -- content --, therefor.

In column 16, line 57, in Claim 40, after "filtering" insert -- function --.

Signed and Sealed this

Thirtieth Day of March, 2010

David J. Kappos
*Director of the United States Patent and Trademark Office*